United States Patent [19]

Smith

[11] Patent Number: 4,475,986

[45] Date of Patent: Oct. 9, 1984

[54] STABLE ACTIVATED CARBON PROCESS USING A MOVING GRATE STOKER FURNACE

[75] Inventor: Jimmy B. Smith, Columbia, Tenn.

[73] Assignee: Peabody Development Company, St. Louis, Mo.

[21] Appl. No.: 530,043

[22] Filed: Sep. 7, 1983

[51] Int. Cl.³ .......................... B01J 8/12; B01J 21/18; C10B 57/02

[52] U.S. Cl. .......................................... 201/7; 201/25; 201/28; 502/421

[58] Field of Search ...................... 201/7, 8, 17, 22, 28, 201/32, 38, 39, 42; 502/421

[56] References Cited

U.S. PATENT DOCUMENTS

| | | | |
|---|---|---|---|
| 3,483,134 | 12/1969 | Olson | 201/38 |
| 3,541,025 | 11/1970 | Oda et al. | 502/421 |
| 3,839,157 | 10/1974 | Hagstrom | 201/39 |
| 3,870,652 | 3/1975 | Whitten et al. | 201/32 |
| 4,100,034 | 7/1978 | Smith et al. | 201/39 |
| 4,156,595 | 5/1979 | Scott et al. | 201/32 |
| 4,242,225 | 12/1980 | Wolfrum | 201/32 |

Primary Examiner—Bradley Garris
Attorney, Agent, or Firm—Littlepage & Webner

[57] ABSTRACT

Carbonaceous raw material, such as lignite coal, having first been passed successively through a moving grate stoker furnace, a shaft furnace and a quench chamber is screened so as to remove from the end product substantially all +12 mesh and larger particles which are then crushed to −12 mesh screen size and recirculated into the stream of raw material enroute through the moving grate stoker.

4 Claims, 1 Drawing Figure

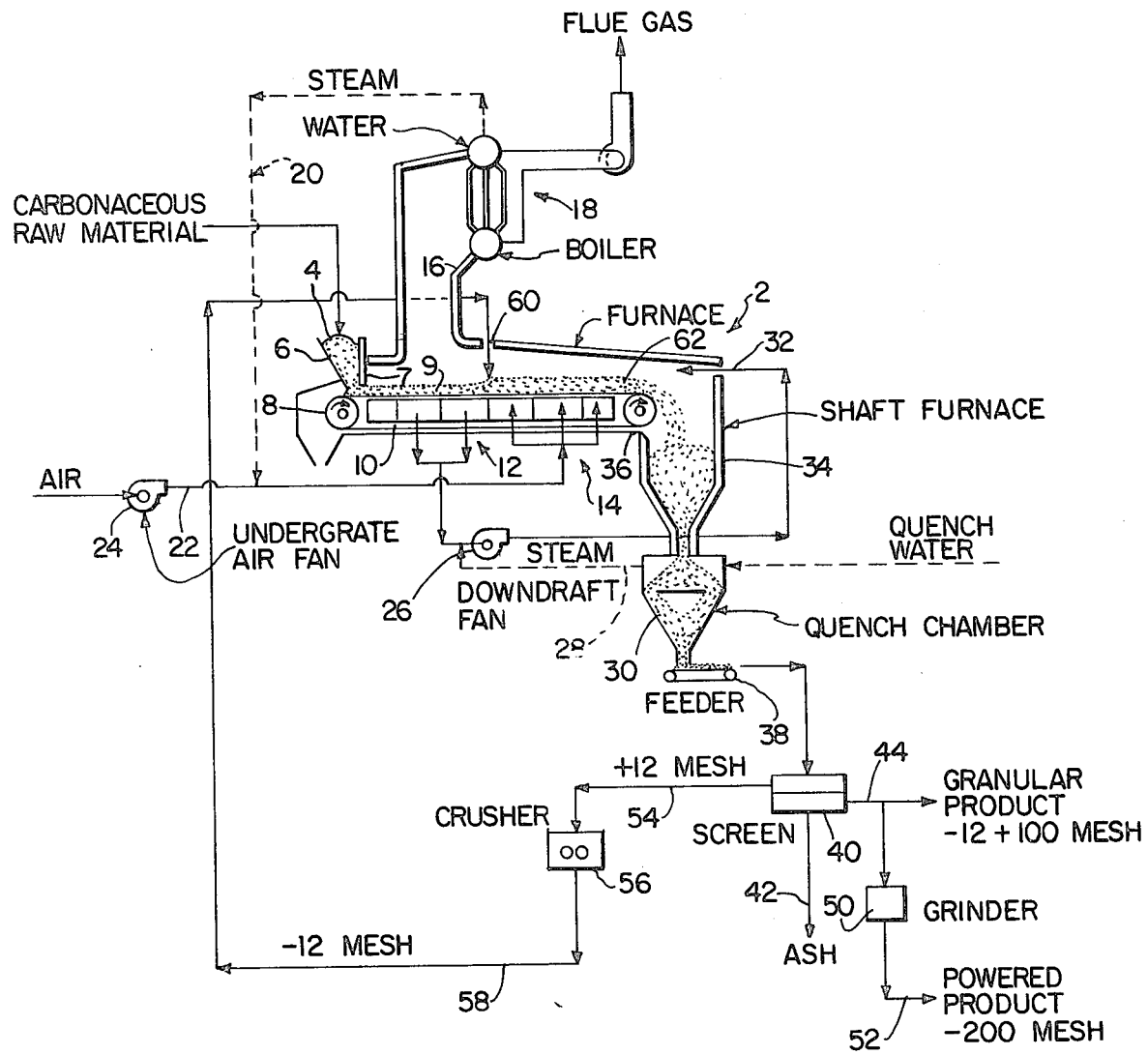

STABLE ACTIVATED CARBON PROCESS USING A MOVING GRATE STOKER FURNACE

FIELD OF INVENTION

Distillation in Moving Bed in Class 201, subclass 32.

BACKGROUND AND OBJECTS

In previous production of activated carbon from raw lignite coal, for example, using a moving grate stoker furnace, the market value of the end product suffered due to comparatively small surface area in relatively large particles. It was found that the −12 +100 mesh cut of this material compared favorably with competing activated carbon products. That portion, however, represented only about 30% of the end product and the quality of the end product was thus reduced by the +12 mesh particles because the +12 mesh particles in the end product had relatively low surface area; and this diminished the market value of the end product.

According to this invention, the +12 mesh material is stripped from the product discharging from the quench chamber and crushed to −12 mesh size, and recirculated with the new starting material passing through the chain grate stoker furnace. The crux of the invention is that merely crushing the +12 mesh end product material to −12 +100 mesh size does not increase the surface area to the extent needed to render them sufficiently active, whereas crushing and then recirculating the over-size particles does sufficiently increase its surface area and render it sufficiently active to be marketable.

These and other objects will be apparent from the following specification and drawing, in which the only FIGURE is a diagram of the process, wherein a chain grate stoker furnace 2 is used to pre-carbonize the input raw material 4, such as lignite coal, which is fed into the furnace via an input hopper 6. The input raw material is spread by spreader gate 7 on to a chain grate 8 to form a bed 9 which passes over a zoned airbox 10 in transit through the furnace. Some of the zones near the entrance end of the furnace are downdrafted as indicated at 12 and those zones near the output end of the furnace are updrafted as indicated at 14. The gaseous by-products from the furnace are taken off through a flue 16 and fed to a boiler 18 which has a steam takeoff 20 for injecting steam into the air line 22 through which air is fed from the undergrate air fan 24 to the updraft zones 14. A downdraft fan 26 pulls the downdrafted gases via downdrafted zones 12 and it also pulls steam from the water quench chamber via steam takeoff 28, the steam and downdrafted gases being fed by downdraft fan 26 back into the furnace chamber via conduit 32. The steam pulled from quench chamber 30 produces the negative pressure in the quench chamber so as to cause hot combustion gases and steam to be drawn downwardly through the pile of hot material which moves downwardly through the shaft furnace 34 at the output end 36 of the furnace 2. This causes further activation and devolatization of material beyond what has occurred in the chain grate furnace. These volatile gases generated in the shaft furnace mix with the downdraft gases which are fed back into the furnace chamber at 32 as previously described.

A feeder 38 at the output of quench chamber 30 is so regulated as to maintain the desired height of the pile moving downwardly through shaft furnace 34, thereby providing the desired residence time of the material in the shaft furnace.

From feeder 38 the then cooled product from the quench chamber 30 is fed to a screen 40 which splits the material three ways, the smallest particles being essentially ash and these are taken off through an ash takeoff 42. The granular end product of −12 +100 mesh is taken from screen via a discharge 44 and this granular end product may be used as is or it may be further reduced in size in a grinder 50 whose output 52 discharges a powdered end product of, for example, −200 mesh. The product issuing from the screen via discharge 44 has sufficient surface area to render it marketable. However, of the material fed to screen 40 at start-up, about 70% emerging from the quencher is +12 mesh size. This is taken from the screen via an output 54 and fed to a crusher 56, wherein it is reduced to −12 mesh size and then it is fed as indicated at 58 back into the shaft furnace via in-feed 60 so that it is deposited as an overburden 62 on the bed 9 of the starting material 4 which by then has progressed part way through the furnace; and this re-circulation of the crushed material increases its surface area so as to render it sufficiently active as to be marketable in competition with standard activating carbon produced by other processes.

While the numbers and percentages of yield per input pound will vary according to the starting material, such lignite coal or wood chips, for example, and variations will occur due to their moisture content, volatiles, fixed carbon and ash, the following examples illustrate the increase in amount and quality of the end product resulting from this process, all numbers being approximations:

---

At Start-up:
Per 100 lbs. raw lignite coal input
30 lbs. total product
70 lbs. loss due to moisture vaporization, volatiles driven off and burned, fixed carbon burned, and ash
Of Total Product:
30% (9 lbs.) acceptable product
70% (21 lbs.) oversize product
Steady State
Per 100 lbs. raw lignite coal input
70 lbs. lost
30 lbs. total product from first pass of raw input; of this:
21 lbs. oversize and recirculated
Of Total Product:
9 lbs. acceptable product from first pass
+21 lbs. acceptable from recirculated particles
= 30 lbs. total acceptable product

---

I claim:

1. A process for producing activated carbon from carbonaceous granular raw starting material which comprises partly devolatilizing said starting material by feeding a bed thereof horizontally through a chain grate furnace from an input end thereof to a laterally spaced output end thereof, further devolatilizing the partly devolatilized material by forming a downwardly moving stack thereof in a shaft furnace disposed to receive the material from the output end of the chain grate furnace, cooling the further devolatilized material by passing the same from the bottom of the stack through a water quench chamber, wherein the cooled material comprises particles ranging in size from relatively large to relatively small and predominantly of relatively large size and which large particles are characterized by relatively poor surface-to-size ratio and which small particles are characterized by comparatively good surface-to-size ratio, splitting the cooled material according to particle size in a screen to produce an end product consisting of part thereof of said relatively small particle size while splitting off the particles predominantly of said relatively large size, crushing the split-off relatively large size particles to relatively small size, and recirculating the crushed particles with the raw starting material passing through the chain grate and shaft furnaces and water quench chamber.

2. The process claimed in claim 1, the end product split of relatively small particle size being predominantly $-12 +100$ mesh in size.

3. The process claimed in claim 2, the relatively large particle split being predominantly of $+12$ mesh size.

4. The process claimed in claim 1, the crushed particles being generally of no larger than $-12$ mesh size.

* * * * *